US 6,409,783 B1

(12) United States Patent
Miyajima et al.

(10) Patent No.: US 6,409,783 B1
(45) Date of Patent: Jun. 25, 2002

(54) AIR CLEANER SYSTEM FOR MOTORCYCLE

(75) Inventors: Yoshikazu Miyajima; Naohisa Hirao, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/656,994

(22) Filed: Sep. 7, 2000

(30) Foreign Application Priority Data

Sep. 7, 1999 (JP) ............................................. 11-292757
Feb. 9, 2000 (JP) ........................................ 2000-031685

(51) Int. Cl.$^7$ ............................................. B62D 61/02
(52) U.S. Cl. ........................ 55/385.3; 180/219; 180/225; 180/227; 123/198 E
(58) Field of Search ........................ 55/385.1, 385.3, 55/27–28; 123/198 E; 180/219, 225, 227

(56) References Cited

U.S. PATENT DOCUMENTS

| 4,402,379 A | * | 9/1983 | Hoshi |
| 4,412,596 A | * | 11/1983 | Pudil et al. |
| 4,484,651 A | * | 11/1984 | Hattori et al. |
| 4,509,613 A | * | 4/1985 | Yamaguchi |
| RE31,994 E | * | 10/1985 | Tominaga et al. |
| 4,648,474 A | * | 3/1987 | Shinozaki et al. |
| 4,796,719 A | * | 1/1989 | Shiratsuchi |
| 5,560,446 A | * | 10/1996 | Onishi |
| 6,283,242 B1 | * | 9/2001 | Umeoka et al. |

FOREIGN PATENT DOCUMENTS

| EP | 644107 A1 | 3/1995 |
| JP | A8216958 | 8/1996 |
| JP | A10196478 | 7/1998 |

OTHER PUBLICATIONS

Patent Abstracts of Japan, Oct. 6, 1992, vol. 16, No. 480 (M–1321), abstract Of JP 04 175459 A.
Patent Abstracts of Japan, Nov. 14, 1990, vol. 14, No. 519 (M–1048), Abstract of JP 02 218855 A.
Patent Abstracts of Japan, Sep. 30, 1999, vol. 1999, No. 11, abstract of JP 11 171076A.
Patent Abstracts of Japan, Sep. 30, 1998, vol. 1998, No. 11, abstract of JP 10 169521A.
Patent Abstracts of Japan, Oct. 29, 1999, vol. 1999, No. 12, abstract of JP 11 192989A.

* cited by examiner

Primary Examiner—Duane Smith
Assistant Examiner—Minh-Chau Pham
(74) Attorney, Agent, or Firm—Birch, Stewart, Kolasch & Birch, LLP

(57) ABSTRACT

To dispose an air cleaner having a large capacity under a fuel tank without changing the capacity and mounting height of the fuel tank. An air cleaner is disposed under a fuel tank in such a manner as to be housed in a space surrounded by a head box and right and left main frames. Independent air cleaner elements and are disposed in parallel in the air cleaner and are connected to independent intake passages A and B, respectively. The intake passages A and B form a dirty room formed in a front portion of a case main body, and are disposed on the left and right sides of water drip walls integrally formed on the bottom of the case main body. The right and left water drip walls are each formed into an approximately V-shape in a plan view and project in the intake passages. The water drip walls also separate an intake pipe opened upwardly in the clean room C from the intake passages A and B. The intake passages A and B are connected to the rear end of an intake space passing through the head box in the longitudinal direction.

20 Claims, 18 Drawing Sheets

FIG. 7
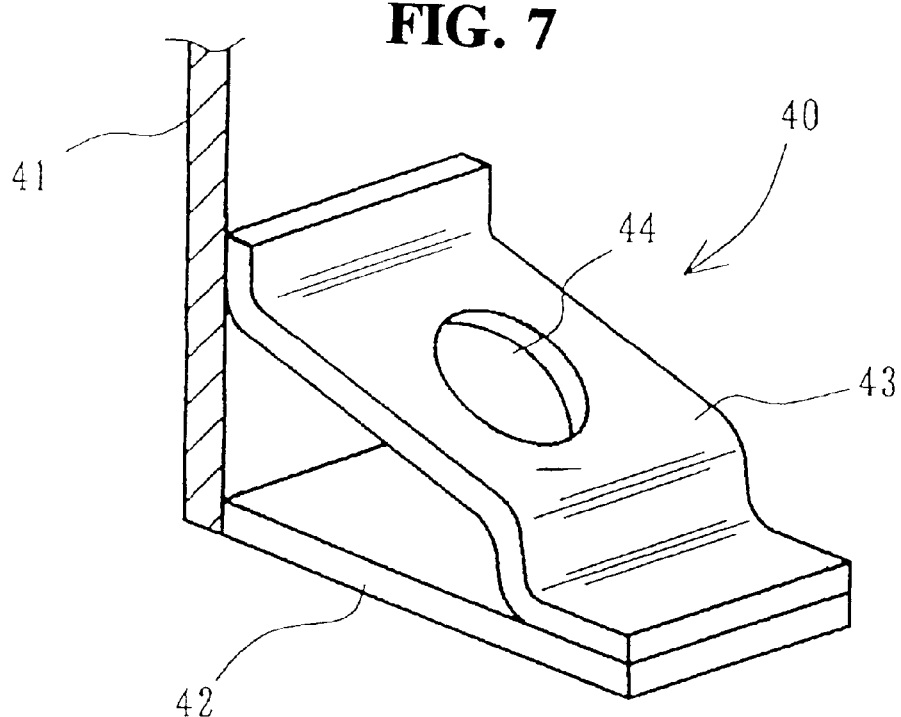
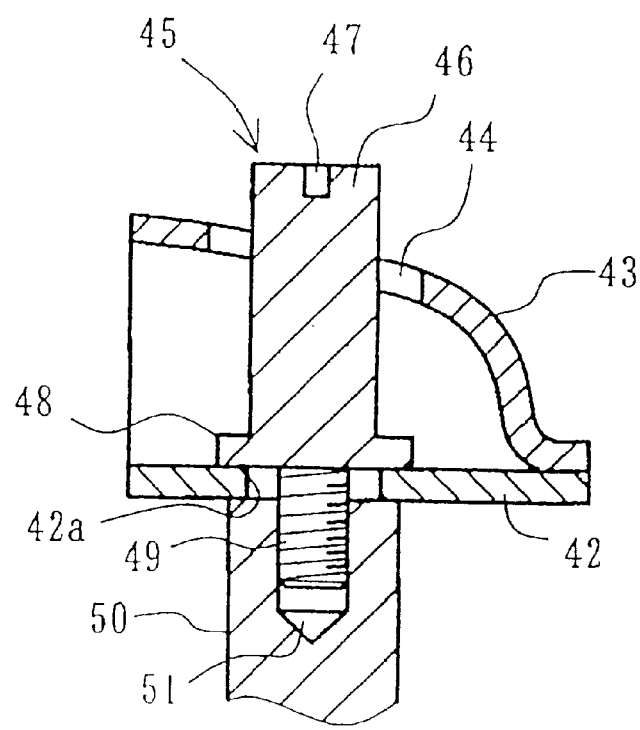
FIG. 8

AIR CLEANER SYSTEM FOR MOTORCYCLE

BACKGROUND OF THE INVENTION

1. Field of the Invention

The present invention relates to an air cleaner system for a motorcycle, which is disposed under a fuel tank, and particularly to an air cleaner system capable of making an air cleaner having a large capacity as compact as possible.

2. Background of the Invention

A motorcycle including an air cleaner disposed between a fuel tank supported over a body frame and an engine supported under the body frame has been known, for example, from Japanese Patent Laid-open No. Hei 8-216958 and Japanese Patent Laid-open No. Hei 10-196478. The air cleaner disposed in the former document has a configuration in which a flat air cleaner element is disposed in the vertical direction, and the air cleaner disposed in the latter document has a configuration in which a cylindrical air cleaner element is also disposed in the vertical direction.

By the way, according to the configuration of the prior art air cleaner, to make the capacity of the air cleaner larger, it is required to make the size of the air cleaner element larger, and to dispose such a larger-sized air cleaner element in the vertical direction, the fuel tank disposed over the air cleaner must be thin or reduced in capacity, or to be shifted upwardly and mounted at a higher position. From the viewpoint of the layout of the vehicular body, however, the fuel tank may be desirable not to be affected by the mounting of the air cleaner.

SUMMARY AND OBJECTS OF THE INVENTION

Accordingly, an object of the present invention is to solve the above-described problem of the prior art air cleaner.

To achieve the above object, according to the present invention, there is provided an air cleaner system for a motorcycle in which an air cleaner is disposed between a fuel tank supported over a body frame and an engine supported under the body frame, characterized in that a plurality of independent air cleaner elements are disposed sideways in a case for the air cleaner.

According to the present invention, a dirty room provided in the case for the air cleaner is partitioned into a plurality of independent intake passages which are each connected to the corresponding one of the air cleaner elements; and part of each of the wall surfaces for partitioning the dirty room into the plurality of intake passages is taken as a water drip wall projecting in the intake passage.

According to the present invention, ribs are formed on the water drip wall in such a manner as to project in the intake passage.

According to the present invention, since an air cleaner element is divided into a plurality of independent parts disposed sideways, it is possible to efficiently dispose the air cleaner element in the case while ensuring a necessary filtering area. As a result, the capacity of the air cleaner can be increased without increasing the size of the air cleaner, so that it is possible to prevent the fuel tank positioned over the air cleaner from being affected by the mounting of the air cleaner, for example, it is not required to reduce the capacity of the fuel tank or to make the mounting position of the fuel tank higher.

According to the present invention, the dirty room provided in the case for the air cleaner is partitioned into a plurality of intake passages which are each connected to the corresponding one of the air cleaner elements, and part of each of the wall surfaces for partitioning the dirty room into the plurality of intake passages is taken as a water drip wall projecting in the intake passage, and accordingly, at least part of the outside air having entered the intake passage can be brought into contact with the water drip wall, and since the water drip wall projects in the intake passage, moisture in the outside air can be separated from the outside air by the contact therebetween. Accordingly, it is possible to effectively remove moisture from the outside air on the upstream side from the air cleaner elements.

According to the present invention, since the ribs projecting in the intake passage are provided on the water drip wall, they function as baffle plates against outside air having entered in the intake passage. As a result, it is possible to further effectively remove moisture in the outside air in addition to the presence of the water drip walls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a perspective view of a stay for mounting an air cleaner element;

FIG. 8 is a sectional view showing the state of mounting the air cleaner element;

DETAILED DESCRIPTION OF THE PREFERRED EMBODIMENTS

Figure 1:
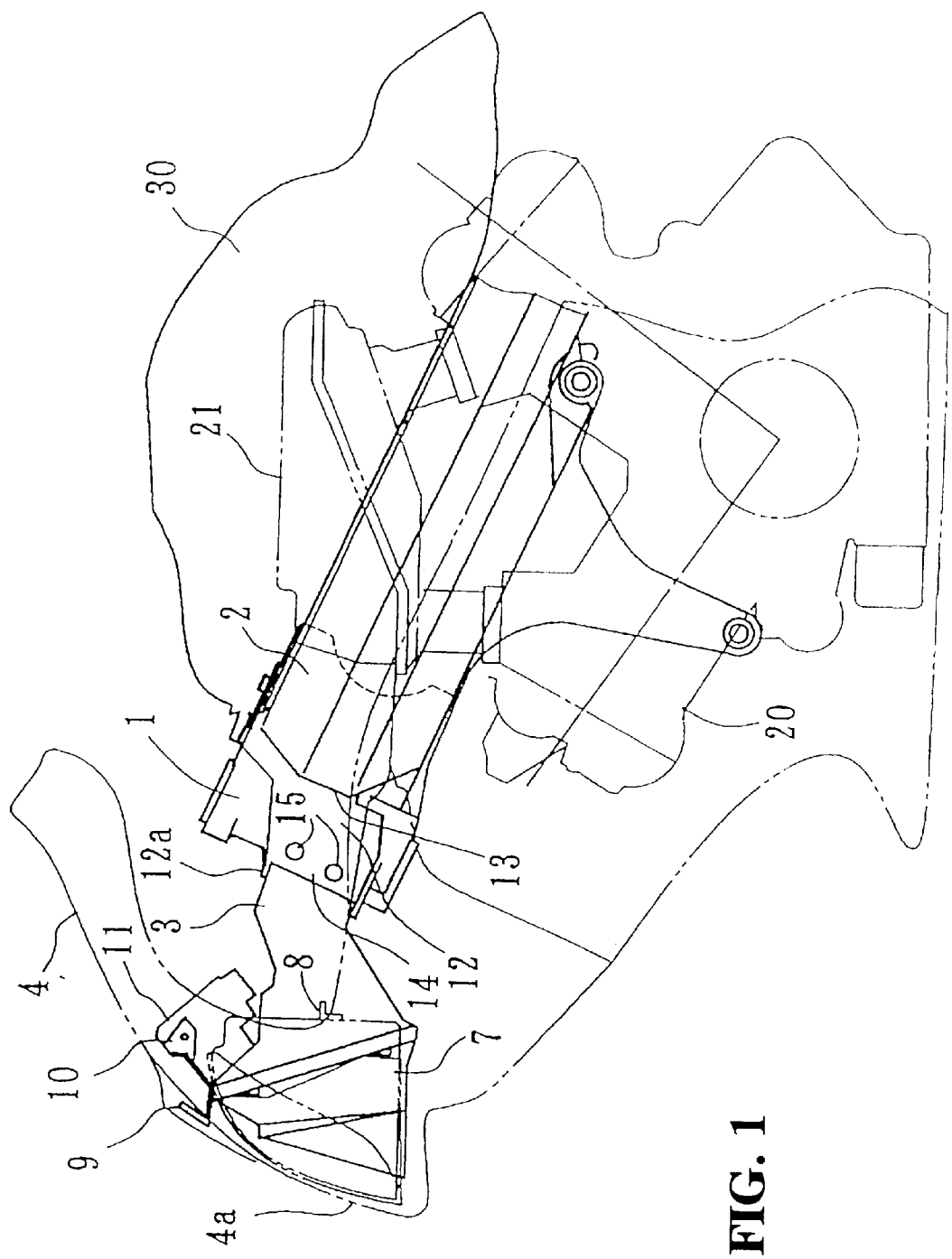
FIG. 1 is a side view of an essential portion of a vehicular body according to a first embodiment (also shown in FIGS. 2 to 8)
Figure 2:
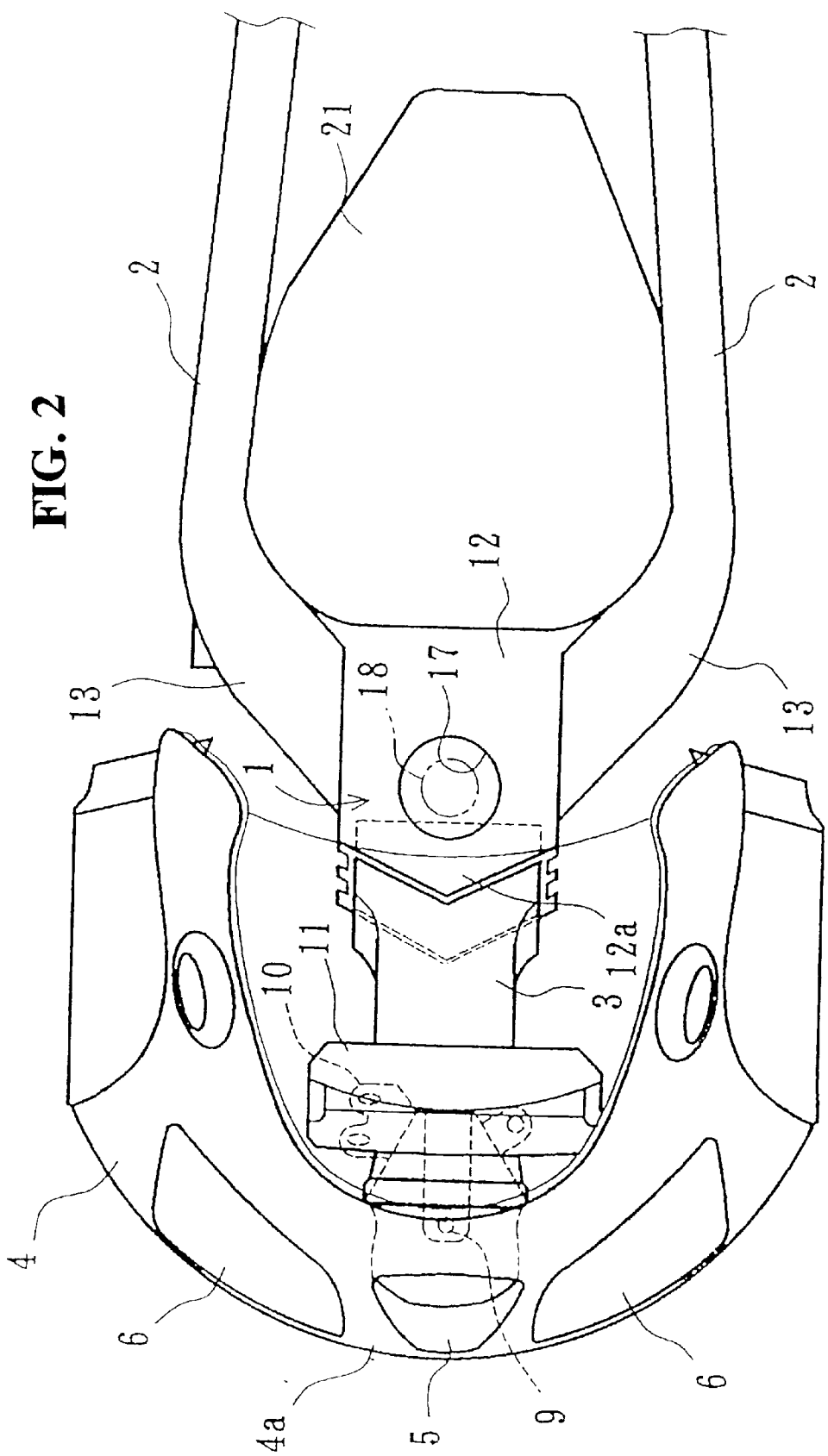
FIG. 2 is a plan view of the essential portion of the vehicular body shown in FIG. 2.
Figure 3:
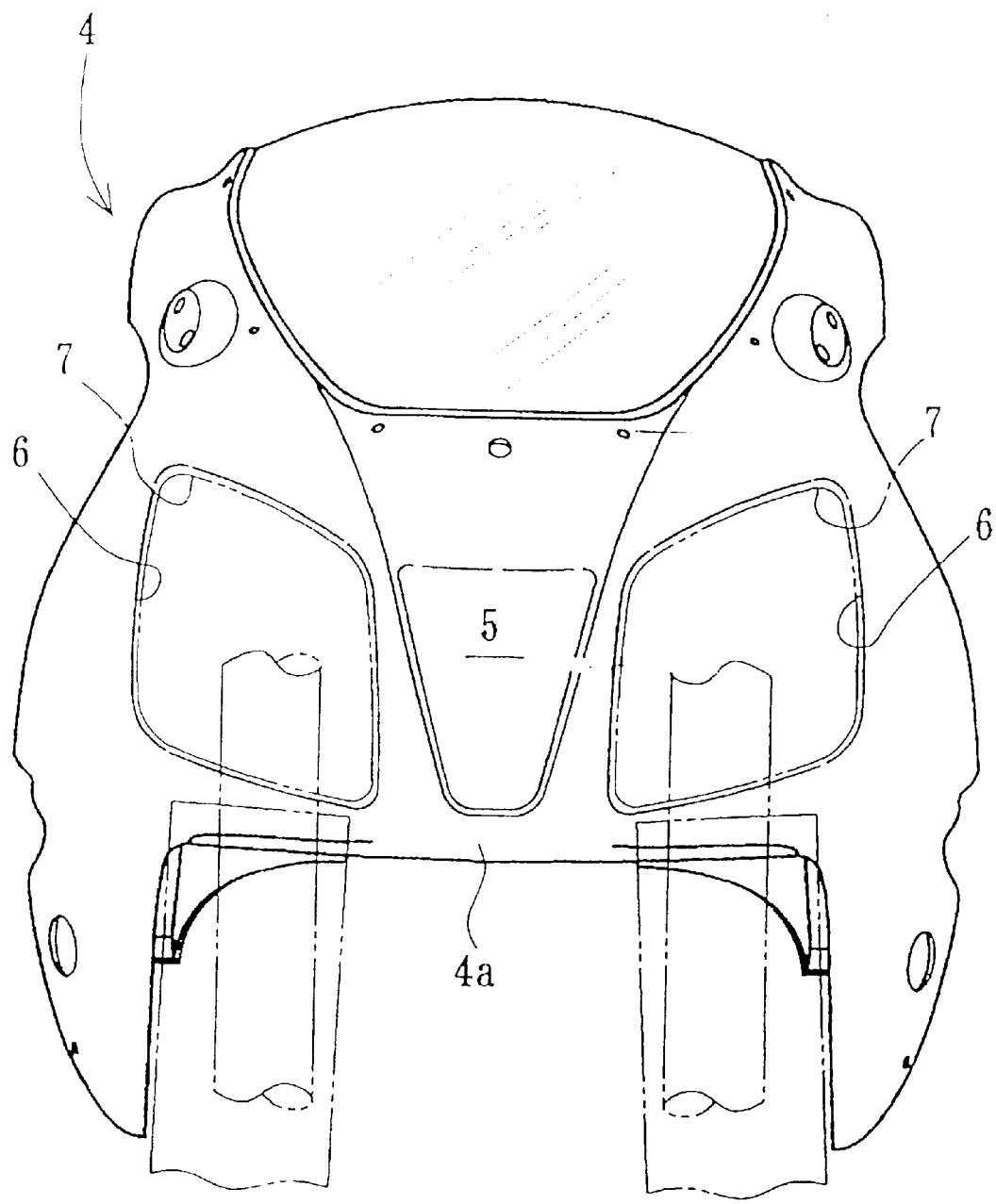
FIG. 3 is a front view of a cowling.

Hereinafter, embodiments of the present invention will be described with reference to the drawings.

Referring to FIGS. 1–18, a body frame includes a head box 1 and a pair of main frames 2 branched from the head box 1 and extending rearwardly therefrom nearly in parallel to each other. The head box 1 and the main frames 2 are made from a suitable material such as an aluminum alloy. The head box 1 is formed into a hollow shape by casing, and the main frame 2 is formed into a hollow shape by a suitable process such as extrusion.

The front end of the head box 1 is connected to the rear end of a hollow intake duct 3 extending in the longitudinal direction while passing through the center line of the vehicular body. The intake duct 3 is made from, typically, a glass fiber reinforced resin. The front end of the intake duct 3 is connected to an outside air inlet 5. The outside air inlet 5 is opened in a nose portion 4a provided at the central portion of the front surface of an upper cowl 4 which is part of the cowling for covering the front body.

The nose portion 4a is the foremost portion of the upper cowl 4 for covering the front portion of the head box 1. The nose portion 4a has the above-described outside air inlet 5 and a pair of headlamp openings 6 positioned on right and left sides of the outside air inlet 5. A headlamp 7 is supported by a headlamp stay 8 provided on each of the right and left side surfaces of the intake duct 3 in a state in which a front lens portion is fitted in the headlamp opening 6. It should be noted that the headlamp 7 is not only supported by the headlamp stay 8 but also supported at three points by the upper cowl 4.

In the prior art structure, various stays have been provided separately from an intake duct, however, since the intake duct 3 in this embodiment is made from glass fiber reinforced resin having a relatively high rigidity, various stays can be collectively integrally provided on the intake duct 3. One cowling stay 9 is integrally provided on the upper portion of the front end of the intake duct 3, which stay is connected to a central portion, over the outside air inlet 5, of the nose portion 4a, to support the upper cowl 4 at one point; and three instrument stays 10 are integrally provided on the intake duct 3 at positions behind the cowling stay 9, to support an instrument panel 11 at three points.

The head box 1 integrally includes a main body 12 extending longer in a straight line in the longitudinal direction while passing through the center line of the vehicular body, and right and left arms 13 branched from the rear end of the main body 12. The head box 1 is formed into an approximate Y-shape in a plan view as a whole. A front end portion 12a of the main body 12 is an opening portion tilted in a forward arrow shape. The rear end of the intake duct 3 is inserted in the opening portion, that is, the front end portion 12a, and is connected thereto by bolts 15. To be more specific, the rear end of the intake duct 3 inserted in the front end portion 12a of the main body 12 is fastened to mounting portions 14 formed on the right and left edges of the front end portion 12a by means of the bolts 15.

A hollow columnar portion 16 having a vane-shaped cross-section is provided in the main body 12 at an approximately central portion in the lateral direction in such a manner as to be put between upper and lower walls of the main body 12. The hollow columnar portion 16 has at its central portion a through-hole 17 passing through the upper and lower walls of the main body 12. A handlebar steering shaft 18 passes through the through-hole 17 in the vertical direction and is turnably supported by bearings provided at upper and lower ends of the hollow columnar portion 16.

Figure 4:
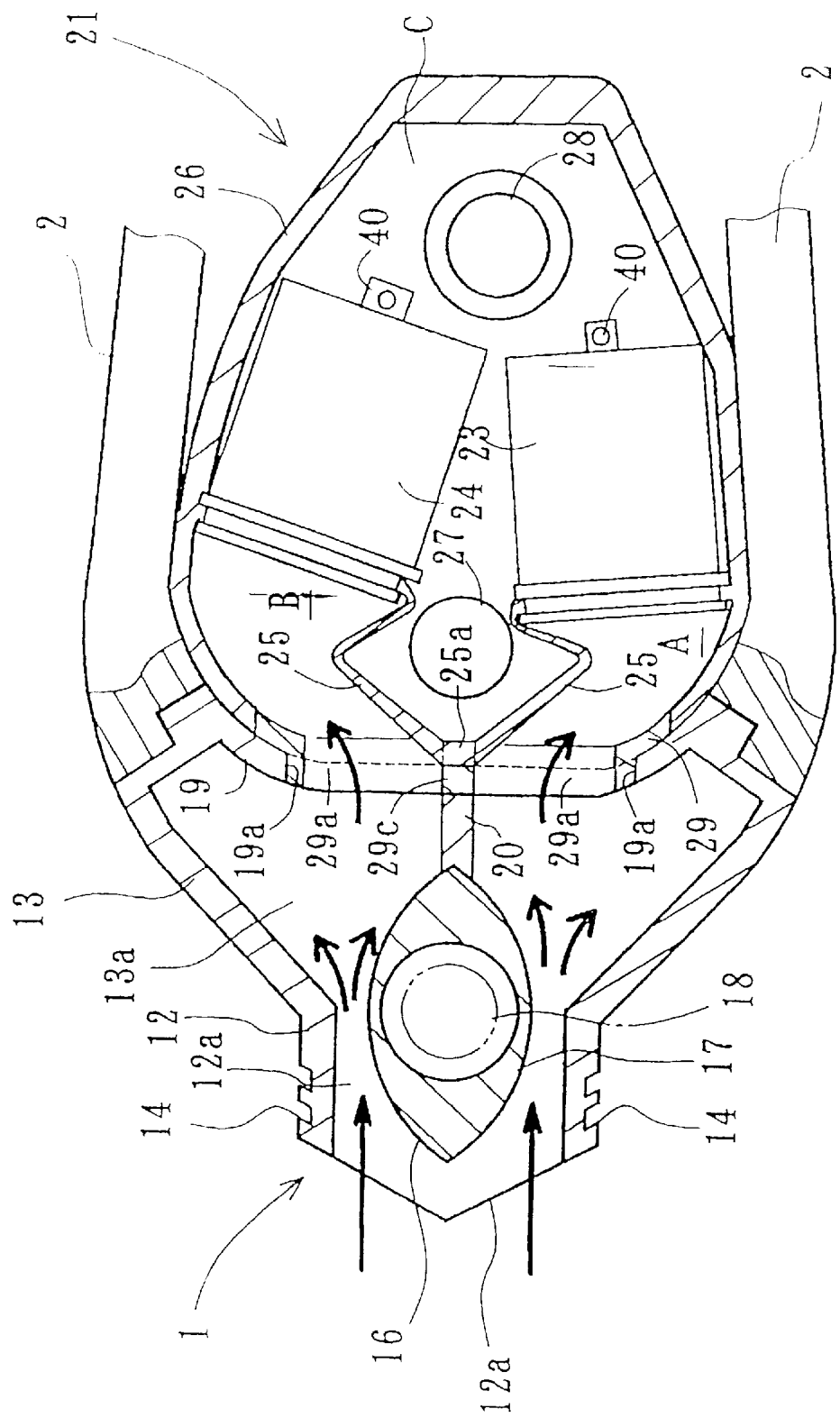
FIG. 4 is a sectional view of a head box and an air cleaner portion.

The hollow columnar portion 16 is disposed in the central portion of the passage of the main body 12 with its major axis directed in the longitudinal direction, to thereby divide each of a space 12b and a space 13a near the hollow columnar portion 16 in the main body 12 into right and left parts (see FIG. 4). The rear end of the inside of the main body 12 is connected to the space 13a that is longer in the lateral direction in the arms 13. The rear end of the space 13a is closed with a rear wall 19 of the head box 1, and the space 13 is communicated to an air cleaner 21 through right and left openings 19a formed in the rear wall 19.

The air cleaner 21 is disposed in a space which is surrounded by the right and left main frames 2 and which is positioned behind the head box 1, and is adapted to supply new air in a down draft into respective cylinders of a V-type four-cycle engine 22 disposed under the air cleaner 21.

Figure 5:
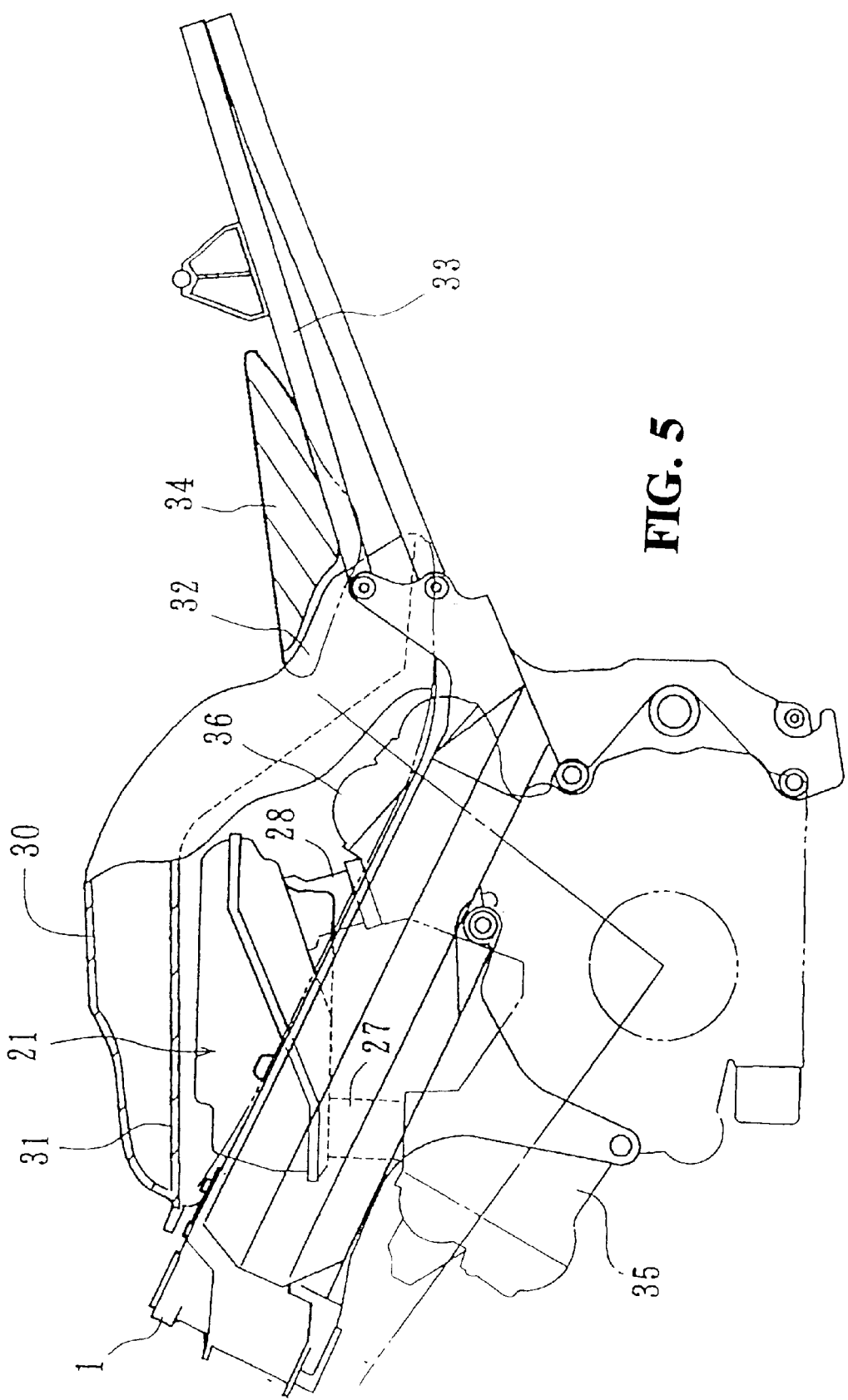
FIG. 5 is a side view, with parts partially cutaway, of an essential portion of the vehicular body.
Figure 6:
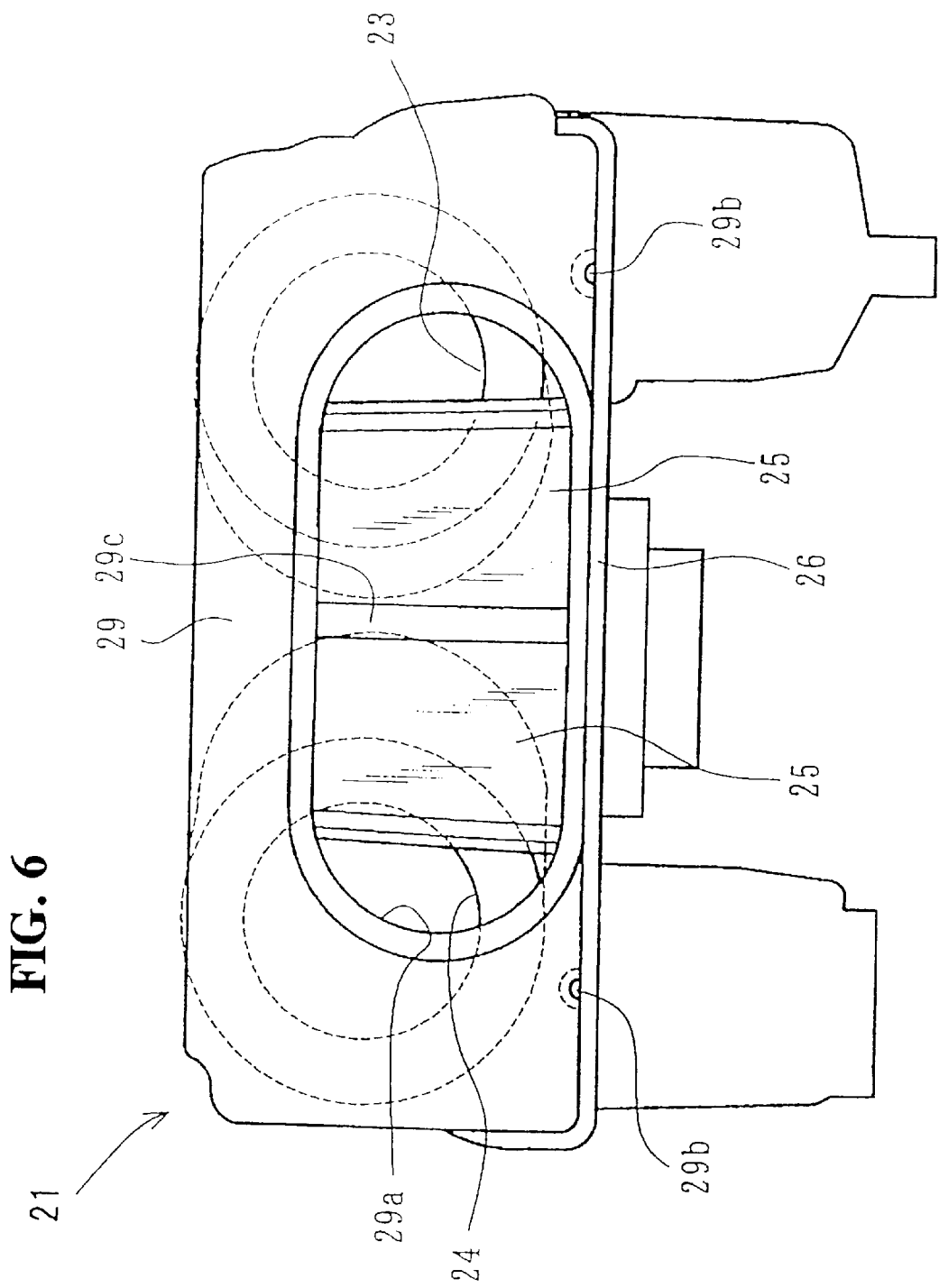
FIG. 6 is a front view of the air cleaner.

The air cleaner 21 will be described in detail below. As shown in FIGS. 5–7, the air cleaner 21 includes a common case main body 26, and two independent cylindrical air cleaner elements 23 and 24 disposed in the case main body 26. The air cleaner elements 23 and 24 suck outside air from the head box 1 side through intake passages A and B provided in the front portion of the case main body 26, respectively.

The inside of the case main body 26 is partitioned into a dirty room on the front side and a clean room C on the rear side. The dirty room is partitioned by a pair of water drip walls 25 into the left intake passage A and the right intake passage B, as seen along the direction of movement of the vehicular body. The clean room C houses the air cleaner elements 23 and 24. Further, intake pipes 27 and 28 are opened in the clean room C.

The air cleaner elements 23 and 24, each having a relatively large capacity and are arranged in parallel to each other in the lateral direction. The air cleaner elements 23 and 24 are tilted slightly upwardly and downwardly, respectively in such a manner that both the rear ends thereof are close to each other. The tilting arrangement of the air cleaner elements 23 and 24 is based on the case shape of the air cleaner 21 which is wider on its front side. In other words, the air cleaner elements 23 and 24, which are tilted in matching to the shape of the air cleaner 21, can be housed in the air cleaner 21 with a high space efficiency. The case shape of the air cleaner 21 is determined on the basis of a space surrounded by the right and left main frames 2 and the head box 1.

The rear side intake pipe 28 is opened upwardly at a position near the rear ends of the air cleaner elements 23 and 24 which are close to each other. The front side intake pipe 27 is similarly opened upwardly at a position near the front ends, apart from each other, of the air cleaner elements 23 and 24. The front side intake pipe 27 is surrounded by the pair of right and left water drip walls 25. The water drip walls 25 are integrally formed on the bottom of the case main body 26 of the air cleaner 21. As is apparent from FIG. 4, each of the water drip walls 25 is bent into an approximately V-shape projecting in the intake passage A or B.

The intake passages A and B on the front side of the case main body 26 are opened, and the opened portions of the intake passages A and B are communicated to communication ports 29a formed in the front surface of a front cover 29 covered on the case main body 26 (see FIG. 6). The communication ports 29a are communicated to openings 19a formed in the rear wall 19 of the head box 1 (see FIG. 4). Right and left drain holes 29b are opened forwardly and are formed in a lower portion of the front surface of the front cover 29 (see FIG. 6).

The rear ends of the water drip walls 25 are continuous to bulkheads in which the front ends of the air cleaner elements 23 and 24 are fitted. The front ends of the water drip walls 25 form a central partition 25a formed into a vertical column shape. The central partition 25a is connected to a front cover bulkhead 29c raised in the vertical direction at the central portion between the right and left communication ports 29a. The front cover bulkhead 29c extends rearwardly from the rear end of the hollow columnar portion 16 and is connected to a partition member 20 for partitioning the space 13 into right and left parts. As a result, the air passage extending from a portion near the front end of the head box 1 to the right and left air cleaner elements 23 and 24 via the intake passages A and B is divided into right and left parts (see FIG. 4).

These intake passages A and B, which form the dirty room on the front side of the case main body 26 while being separated from each other by the water drip walls 25, are connected to the air cleaner elements 23 and 24, respectively. The water drip walls 25, which separate the intake passages A and B from each other, also separate the intake passages A and B on the dirty room side from the front side intake pipe 27 opened upwardly to the bottom of the clean room C.

The rear ends of the air cleaner elements 23 and 24 are mounted on the bottom of the case main body 26 by means of stays 40. As shown in FIGS. 7 and 8, the stay 40 includes a lower plate 42 projecting from a frame 41 of the air cleaner element and an upper plate 43 obliquely overlapped on the lower plate 42.

One end of the upper plate 43 is welded to a portion, positioned over the lower plate 42, of the frame 41, and the other end of the upper plate 43 is overlapped to the projecting end of the lower plate 42 and welded thereto. A bolt hole 44 is formed in a central portion of the upper plate 43. A flanged bolt 45 is inserted in the bolt hole 44 in such a manner that the upper end of a long head 46 of the flanged bolt 45 projects from the bolt hole 44. The upper end of the head 46 of the flanged bolt 45 has a driver groove 47 for allowing an operator to fasten the flanged bolt 45 by using a driver (not shown) with its end inserted in the driver groove 47.

A flange 48 provided at the lower end of the head 46 of the flanged bolt 45 is abutted against the lower plate 42. The diameter of the flange 48 is larger than each of the diameter of a through-hole 42a formed in the lower plate 42 and the diameter of the bolt hole 44 for preventing the falling of the flanged bolt 45. A threaded portion 49 projecting downwardly from the head 46 is screwed in a threaded hole 51 of a boss 50 integrally formed on the bottom of the case main body 26. In this way, the air cleaner elements 23 and 24 are fixed to the case main body 26. With this configuration, the flanged bolt 45 is advantageously prevented from falling from the bolt hole 44 of the upper plate 43 and the through-hole 42a of the lower plate 42.

As shown in FIG. 5, the upper side of the air cleaner 21 is covered with a fuel tank 30. A raised bottom portion 31 of the fuel tank 30, positioned over the air cleaner 21, is raised in order to ensure, under the raised bottom portion 31, a sufficient space in which the air cleaner 21 is disposed. A rear portion of the fuel tank 30 extends rearwardly passing the rear ends of the main frames 2, to form an extension portion 32.

The extension portion 32 is disposed between a pair of seat rails 33 extending obliquely upwardly, rearwardly from the rear ends of the right and left main frames 2 in such a manner that the rear end portion of the extension portion 32 extends under a seat 34 supported by the seat rails 33. With this configuration, it is possible to make the raised bottom portion 31 of the fuel tank 30 thin while ensuring a required capacity of the fuel tank 30, and hence to ensure the arrangement space for disposing the air cleaner 21 having a large capacity.

The engine 22 has a front cylinder 35 and a rear cylinder 36. Air is sucked from the clean room C (see FIG. 4) of the air cleaner 21 into intake ports of the front and rear cylinders 35 and 36 in a down draft through the front side intake pipe 27 and the rear side intake pipe 28, respectively. In this embodiment, a space around the air cleaner elements 23 and 24 in the air cleaner 21 forms the clean room C having a large capacity.

The function of this embodiment will be described below. Since the air cleaner elements 23 and 24 are disposed in parallel to each other and are independently connected to the intake passages A and B as shown in FIG. 4, it is possible to sufficiently ensure the filtering area of the air cleaner 21, even if the air cleaner 21 is required to have a large capacity, by adding the filtering areas of the air cleaner elements 23 and 24 to each other. Further, since the air cleaner element in this embodiment is divided into the independent air cleaner elements 23 and 24, as compared with the case of providing a single large-sized air cleaner element, the air cleaner element in this embodiment, which is divided into the air cleaner elements 23 and 24, can be more efficiently disposed in the case main body 26 of the air cleaner 21 whose shape is restricted, to thereby make the air cleaner 21 compact while sufficiently ensuring the capacity of the air cleaner 21.

Accordingly, the air cleaner 21 having a large capacity can be disposed under the fuel tank 30 without changing the capacity and the mounting height of the fuel tank 30, with a result that the degree of freedom in the layout of the vehicular body can be enhanced. Since the intake passages A and B are directed to the hollow columnar portion 16, the flow of outside air, which is split right and left at the hollow columnar portion and is directed obliquely rearwardly, can be smoothly introduced in the air cleaner elements 23 and 24. As a result, it is possible to improve the intake efficiency of outside air.

Since the dirty room provided in the case main body 26 of the air cleaner 21 is partitioned into the independent intake passages A and B connected to the corresponding air cleaner elements 23 and 24 and part of the wall for partitioning the intake passages A and B is taken as the water drip walls 25 projecting in the intake passages A and B, at least part of outside air having entered the intake passages A and B can be brought into contact with the water drip walls 25. At this time, since the water drip walls 25 each having an approximate V-shape in the top view and project in the intake passages A and B, moisture in the outside air can be easily separated from the outside air by the contact therebetween and the moisture thus separated can be discharged to the outside through the drain holes 29b.

Accordingly, moisture contained in outside air can be effectively removed in the intake passages A and B located on the upstream side from the air cleaner elements 23 and 24. Further, since the opening of the front side intake pipe 27 is separated by the intake passages A and B by the water drip walls 25, water and mud from the intake passages A and B does not flow into the front side intake pipe 27 but drop on the bottom on the front end side of the case main body 26 to be discharged to the outside from the drain holes 29b (see FIG. 6). As a result, since the upwardly opened intake pipe 27 can be disposed at a position at which it is overlapped to the intake passages A and B in the vertical direction in a side view, the intake pipes 27 and 28 can be disposed in the bottom of the air cleaner 21 in the longitudinal direction. Such a configuration is suitable for the down draft type intake structure of the longitudinal V-type engine.

Figure 9:
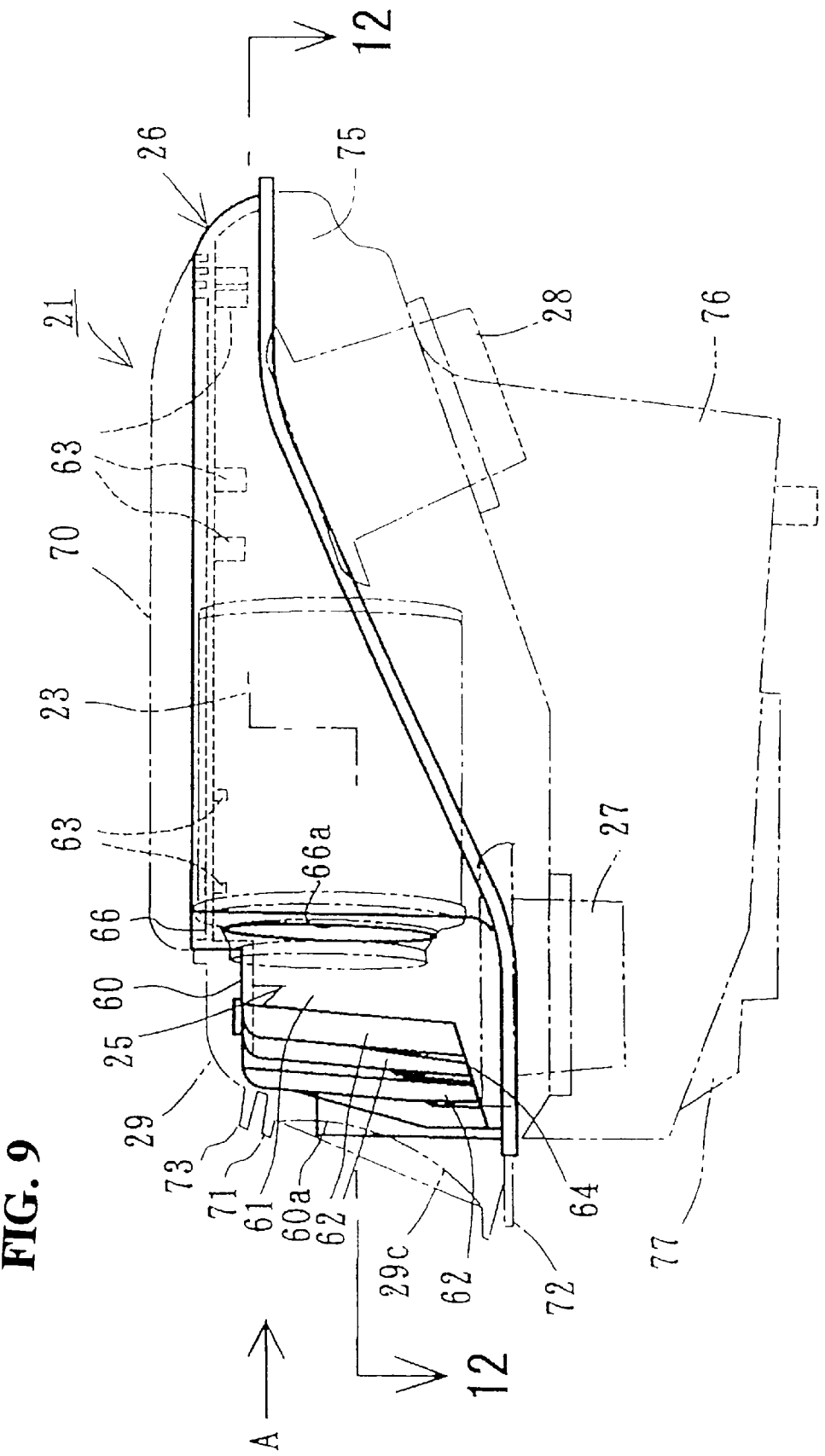
FIG. 9 is a side view of a case main body according to a second embodiment (also shown in FIGS. 10 to 19)
Figure 10:
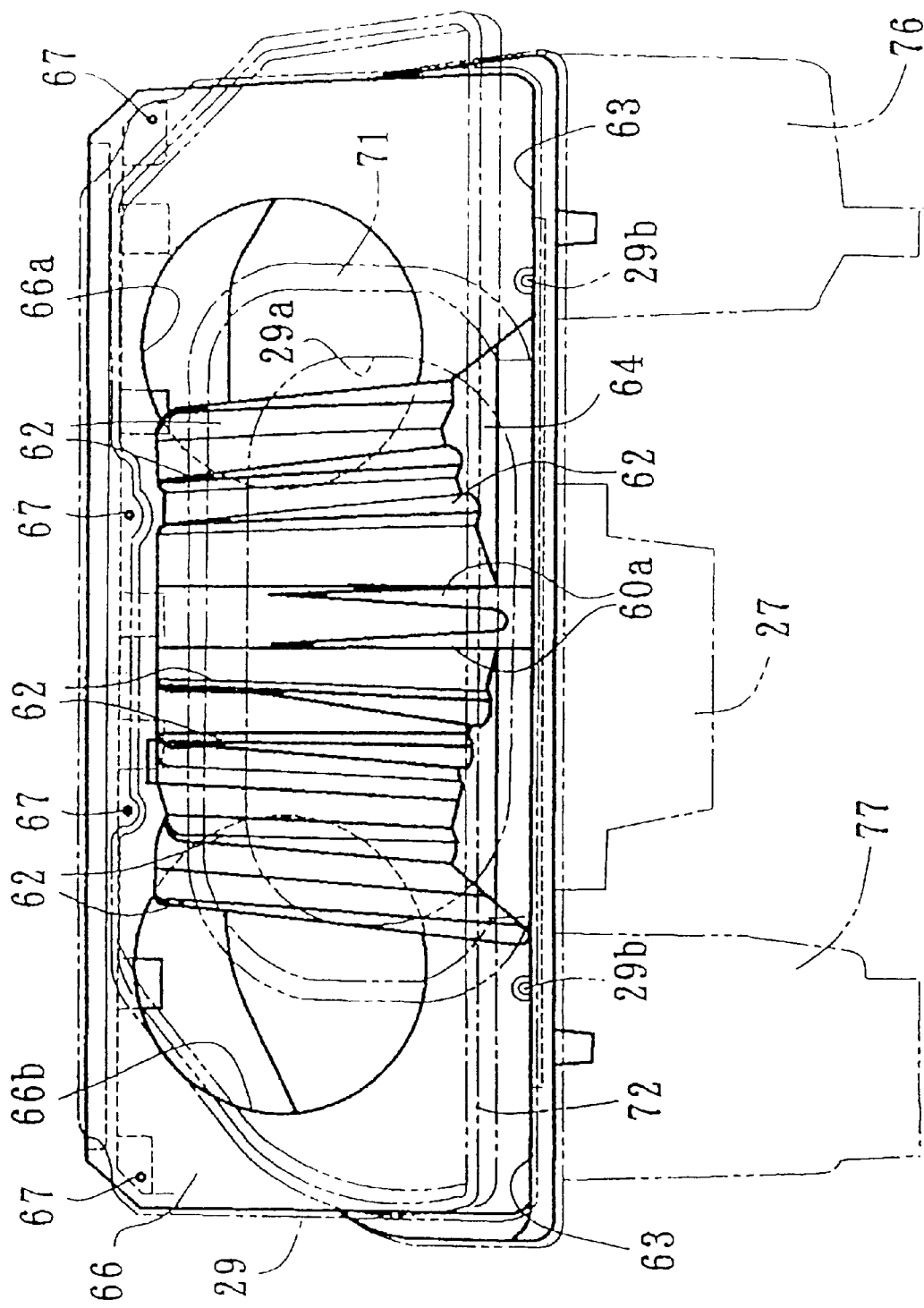
FIG. 10 is a front view of the air cleaner shown in FIG. 9.
Figure 11:
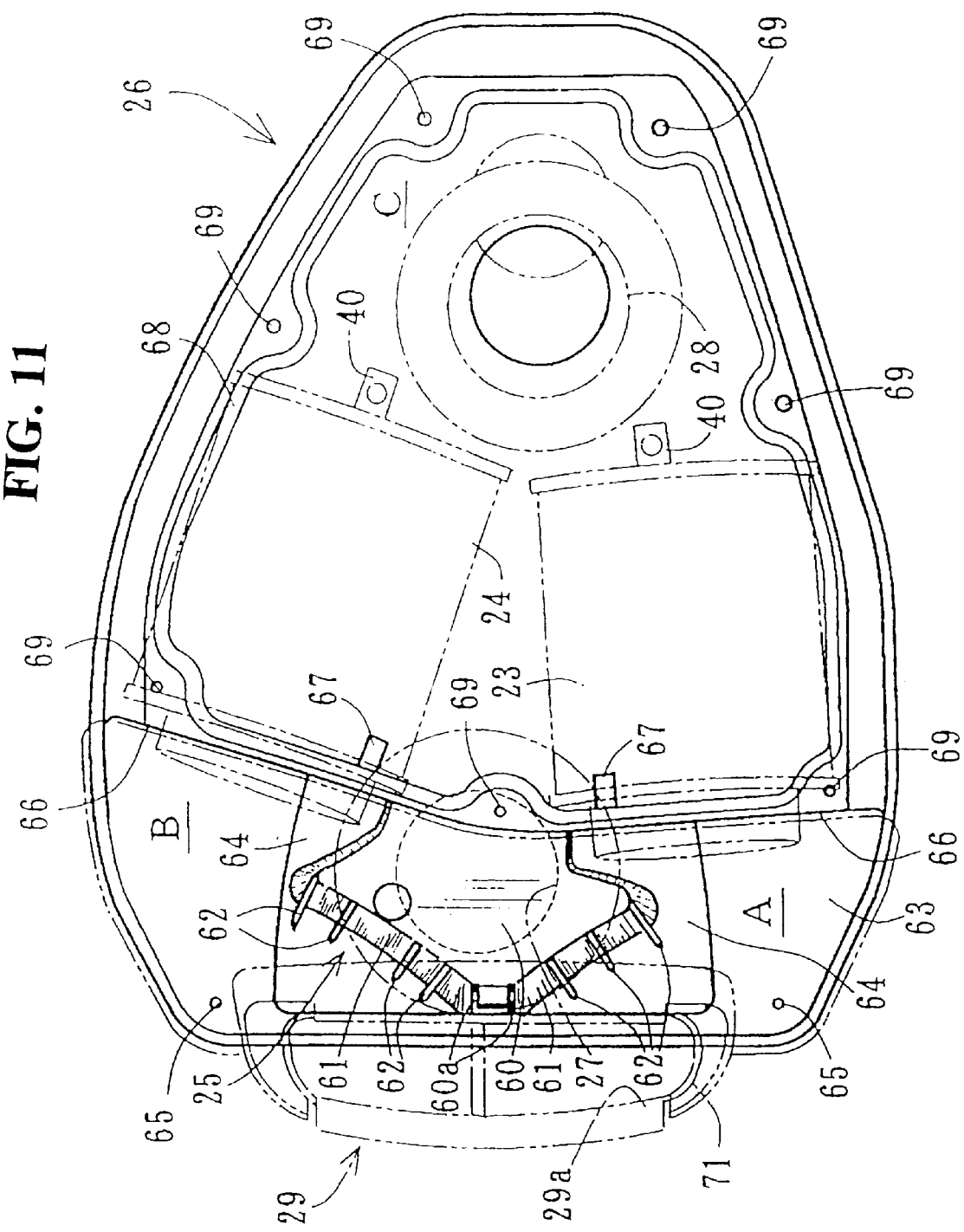
FIG. 11 is a top view of the case main body.
Figure 12:
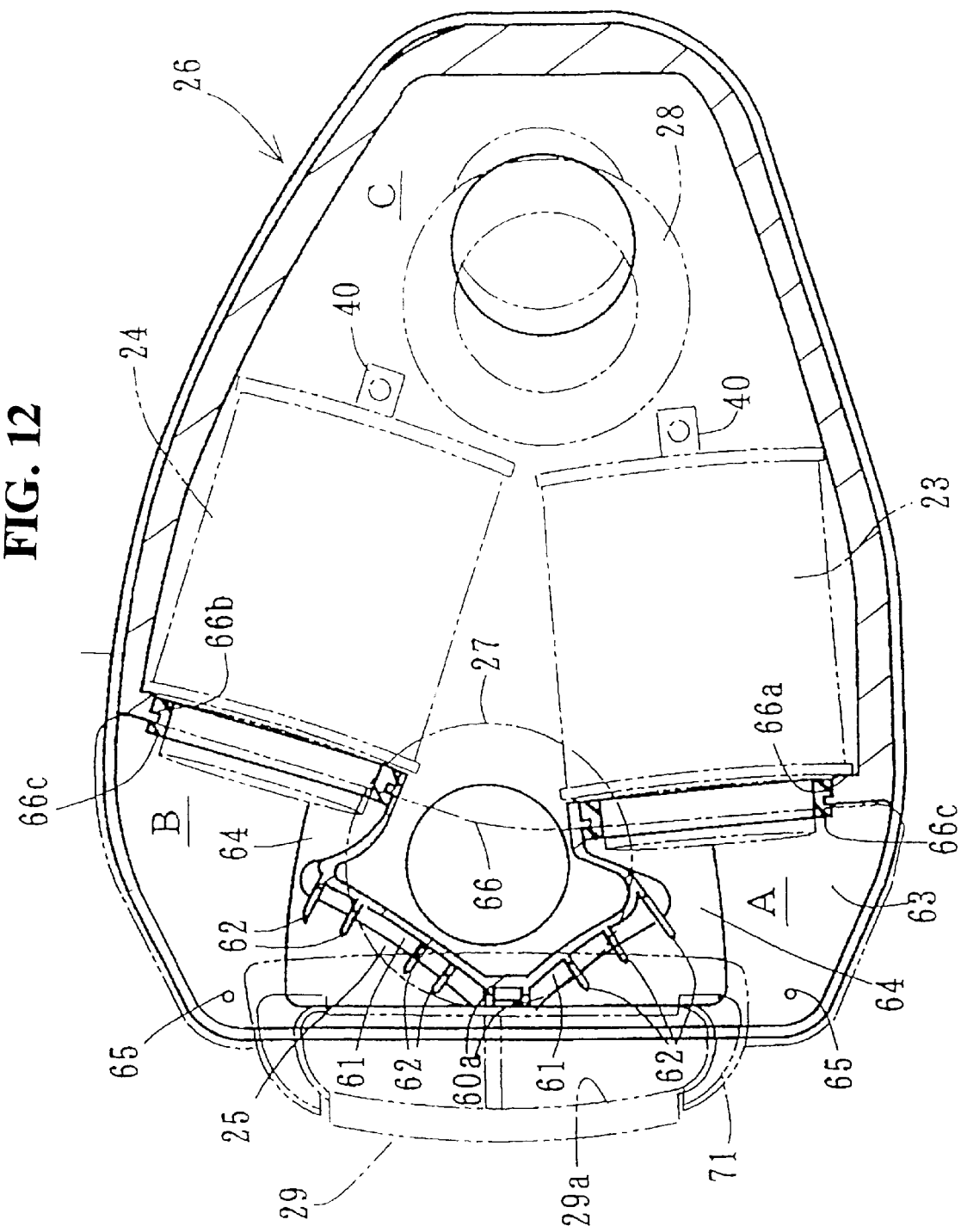
FIG. 12 is a sectional view taken on line 12—12 of FIG. 9.

Next, an air cleaner according to a second embodiment will be described. Since the air cleaner in this embodiment is only partially different from the air cleaner in the previous embodiment, parts in this embodiment, which are common in function to those in the previous embodiment, are designated by the common characters, and the overlapped explanation thereof is omitted. FIG. 9 is a side view of a case main body 26 of an air cleaner 21 in this embodiment, wherein the side shape of the case main body 26 is shown by a solid line and other parts are shown by a virtual line; FIG. 10 is a front view, similar to FIG. 6, of the air cleaner 21 as seen along the direction A of FIG. 9; FIG. 11 is a top view of the case main body 26; and FIG. 12 is a sectional view taken on line 12—12 of FIG. 9.

Referring to FIGS. 9–12, water drip walls 25 formed on a front portion of the case main body 26 for partitioning intake passages A and B include a ceiling portion 60 and side walls 61 which are formed into a box-shape. An opening of an intake pipe 27 is covered with the box-like ceiling portion 60 and the side walls 61. A plurality of ribs 62 extending in the vertical direction are integrally formed on a surface, facing to each of the intake passages A and B, of the side wall 61.

The lower end of the side wall 61 is continuous to a stepped portion 64 which is higher than a bottom wall 63, on the front side of the case main body 26, on which the intake passages A and B and the water drip walls 25 are formed. The stepped portion 64 is tilted both in the forward direction and in the lateral direction, and is continuous to the common surface of the bottom wall 63 lower than the stepped portion 64. The bottom wall 63 is continuous at its front end to drain holes 29b.

Right and left mounting portions 65, in which a front portion of a front cover 29 is to be screwed from above, are provided on the front end of the bottom wall 63 at positions near the drain holes 29b. Mounting portions 67, in which a rear portion of the front cover 29 is to be screwed from the front, are provided on an upper portion of a bulkhead 66 for partitioning front portions of the intake passages A and B and a clean room for housing air cleaner elements 23 and 24 (see FIG. 11).

The upper surface of a portion, on the clean room side, of the case main body 26 is formed into a frame shape, and an annular fitting groove 68 is formed in the peripheral portion of the frame. Mounting portions 69, in which a main body cover 70 (see FIG. 9) is to be removably screwed, are provided along the fitting grooves 68 in such a manner as to be spaced from each other at suitable intervals. The bulkhead 66 has mounting holes 66a and 66b in which front ends of the air cleaner elements 23 and 24 are to be fitted, respectively (see FIG. 10). The air cleaner elements 23 and 24 are airtightly fitted in the mounting holes 66a and 66b via seal members 66c, respectively (see FIG. 12).

An annular wall 71 is provided around a communication port 29a of the front cover 29 in such a manner as to surround the communication port 29a. A projection 72, which projects forwardly from the front end of the bottom wall 63 of the case main body 26, is integrated with the lower portion of the annular wall 71 (see FIG. 9). The drain holes 29b are opened in a boundary between the projection 72 and the annular wall 71 (see FIG. 10). Front ends of the annular wall 71 and the projection 72 are in close-contact with a rear wall 19 of a head box 1.

In FIG. 9, a case bottom portion 75 is provided which is integrated to the upper side case main body 26 to form an air cleaner case. The intake pipes 27 and 28 pass through the bottom portion 75 to be opened in a clean room C. Side portions 76 and 77 project downwardly from the bottom portion 76 in such a manner so as to put the intake pipes 27 and 28 therebetween in the lateral direction. The side portions are each formed into a box-shape opened upwardly and are communicated to the clean room C, to thereby enlarge the capacity of the clean room C.

The connection structure between the head box 1 and the air cleaner 21 will be described with reference to FIGS. 13 to 19.

Figure 13:
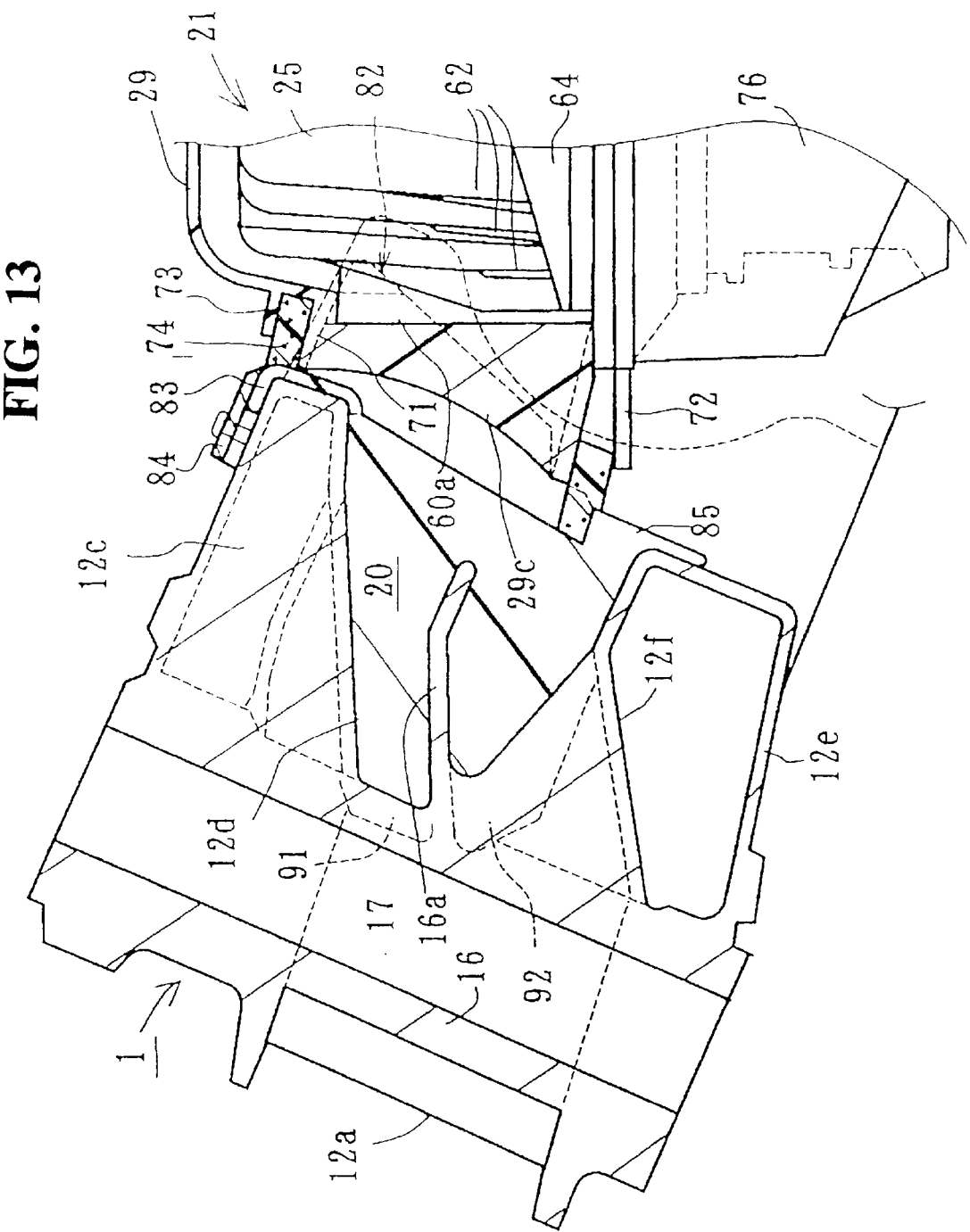
FIG. 13 is a sectional view showing an essential portion of a connection portion between a head box and an air cleaner.

FIG. 13 shows the cross-section, cut along an approximately center line of the vehicle, of the connection portion between the head box 1 and the air cleaner 21. As is apparent from FIG. 13, a ceiling portion 12c and a bottom portion 12e are formed on the top and bottom of a rear portion of a main portion 12 of the head box 1 in such a manner so as to project rearwardly, respectively. A lower surface 12d of the ceiling portion 12c and an upper surface 12f of the bottom portion 12e are each tilted forwardly, downwardly. A space 13a (see FIG. 4) surrounded between the lower surface 12d and the upper surface 12f is communicated to the opening of a front end portion 12a of the main body 12 via a space 12b (see FIG. 4) formed on the right and left sides of a hollow columnar portion 16, to form an air passage for introducing air to the air cleaner 21 as a whole.

In the space 13a, a portion of the main body 12, positioned intermediately between the lower surface 12d and the upper surface 12f, extends rearwardly from the rear portion of the hollow columnar portion 16 along the center line of the vehicle, to form a rib 16a. The rib 16a is formed into an approximate V-shape in a side view. A partitioning member 20 for dividing the space 13a (see FIG. 4) into right and left parts is mounted by making use of the rib 16a.

A rearward extension portion 82, which extends rearwardly from a rear portion of the partitioning member 20 along the center line of the vehicle, passes the center of the communication port 29a of the front cover 29 in the longitudinal direction. The rearward extension portion 82 is connected to a front cover bulkhead 29c and also connected to a lateral separation rib 60a formed at the central portion of the front surfaces of the water drip walls 25 of the air cleaner 21. The front end of an intake passage seal 74, which is provided on the front surface of the front cover 29 in such a manner so as to surround the communication port 29a, is in close-contact with the periphery of the opening of the partitioning member 20 in such a manner so as to surround the opening of the partitioning member 20. The partitioning member 20 will be described in detail later.

Figure 14:
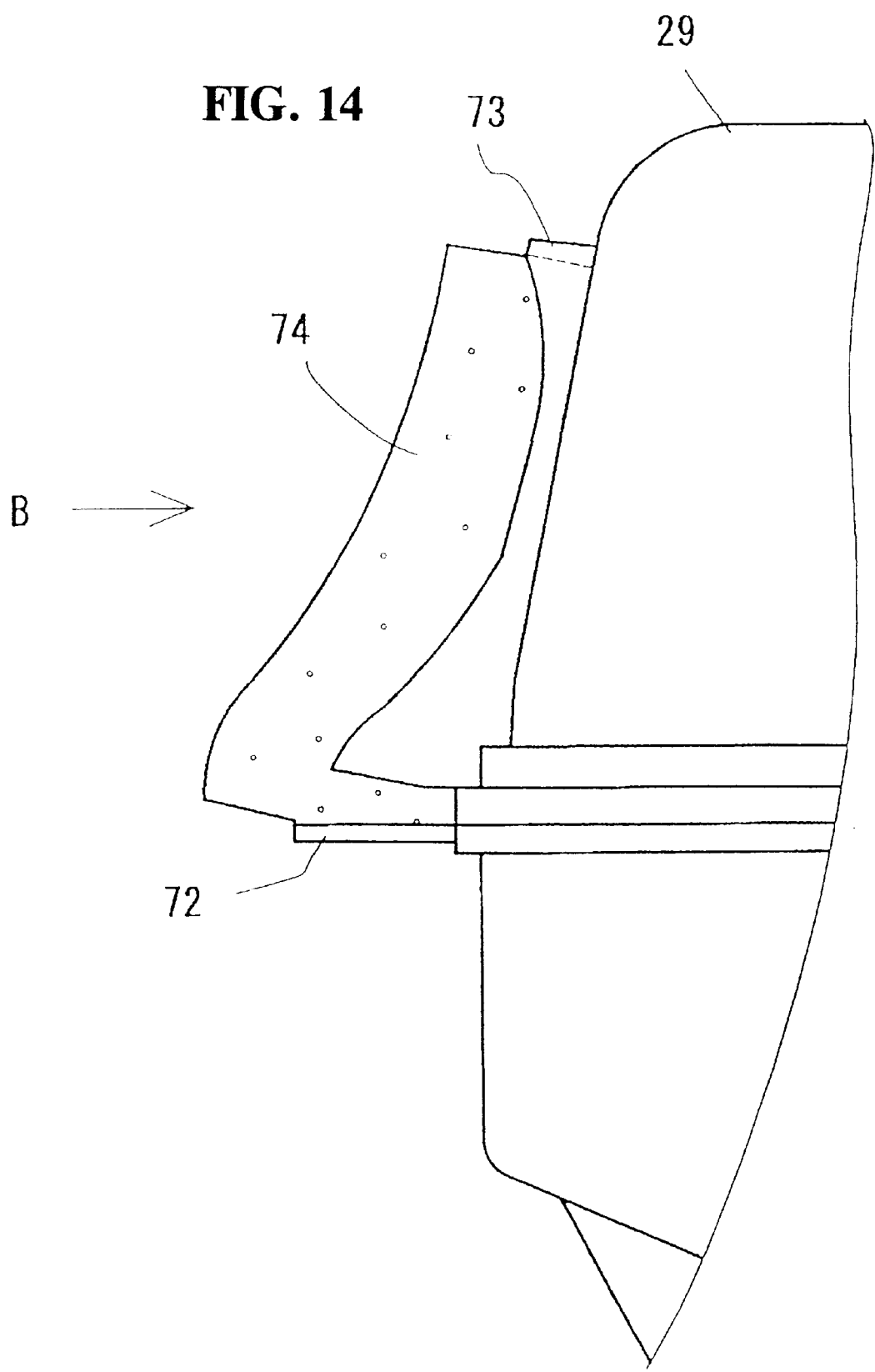
FIG. 14 is a side view showing a seal portion for sealing the intake passage of the air cleaner.
Figure 15:
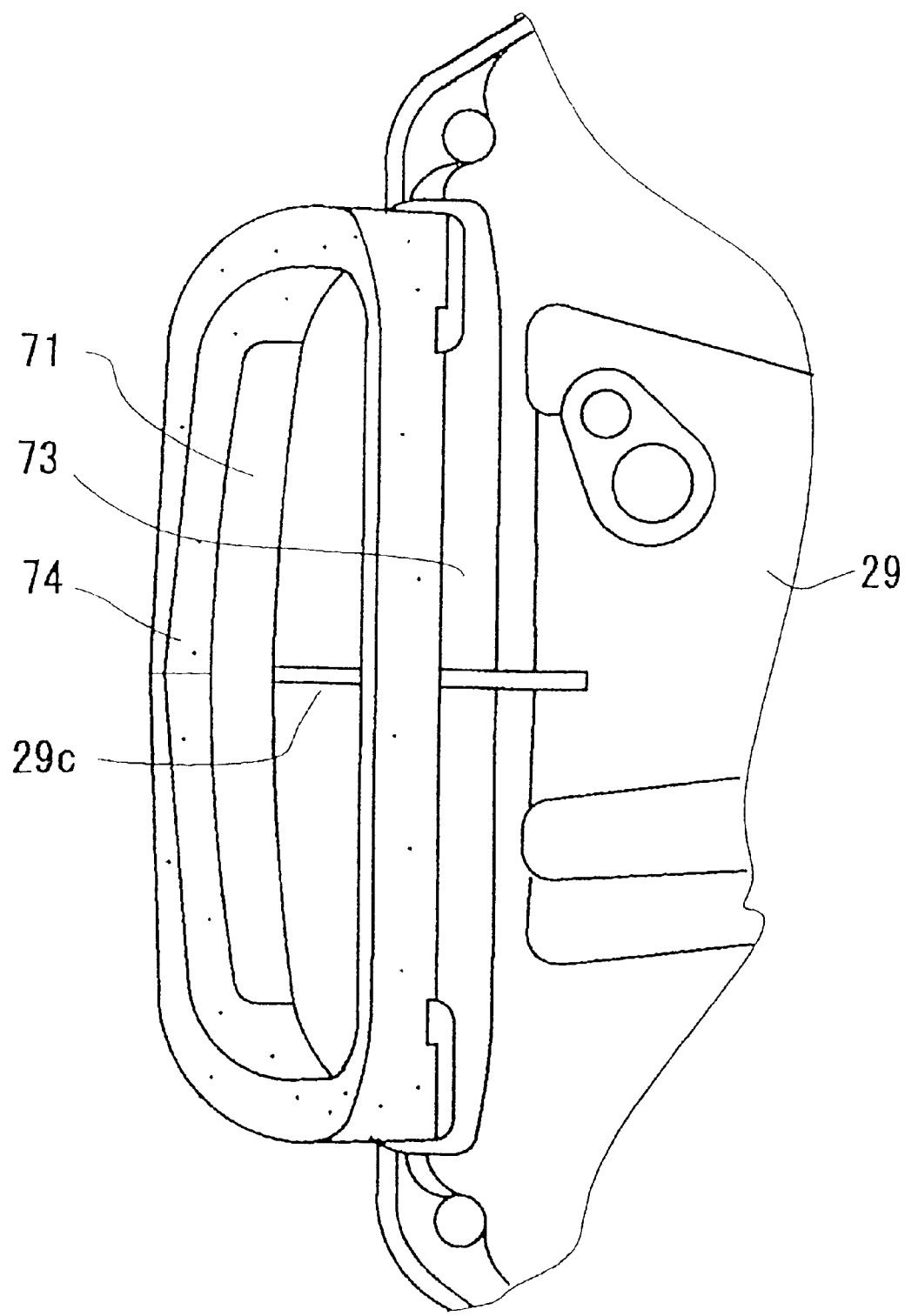
FIG. 15 is a plan view of the seal portion.
Figure 16:
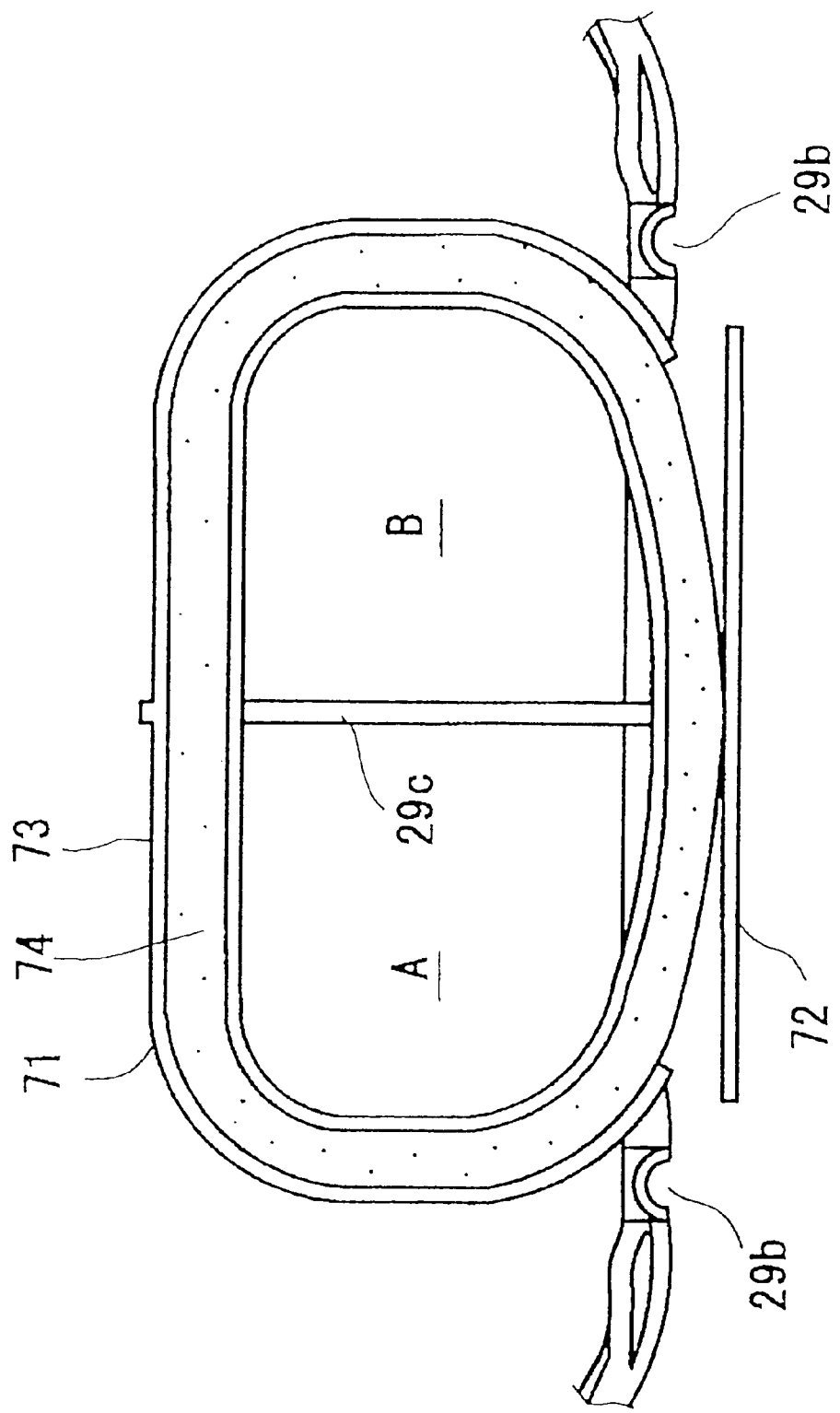
FIG. 16 is a view seen along the direction B of FIG. 14.

As is apparent from FIGS. 14 to 16, the intake passage seal 74 is made from a suitable elastic material such as rubber. The intake passage seal 74 is pressed in a gap formed among the annular wall 71 for surrounding the communication port 29a of the front cover 29, an external wall 73 separated sideways or upwardly from the annular wall 71 with a gap put therebetween, and a lower side projection 72. The front end of the intake passage seal 74 is elastically pressed to the partitioning member 20, to be airtightly connected thereto.

Figure 17:
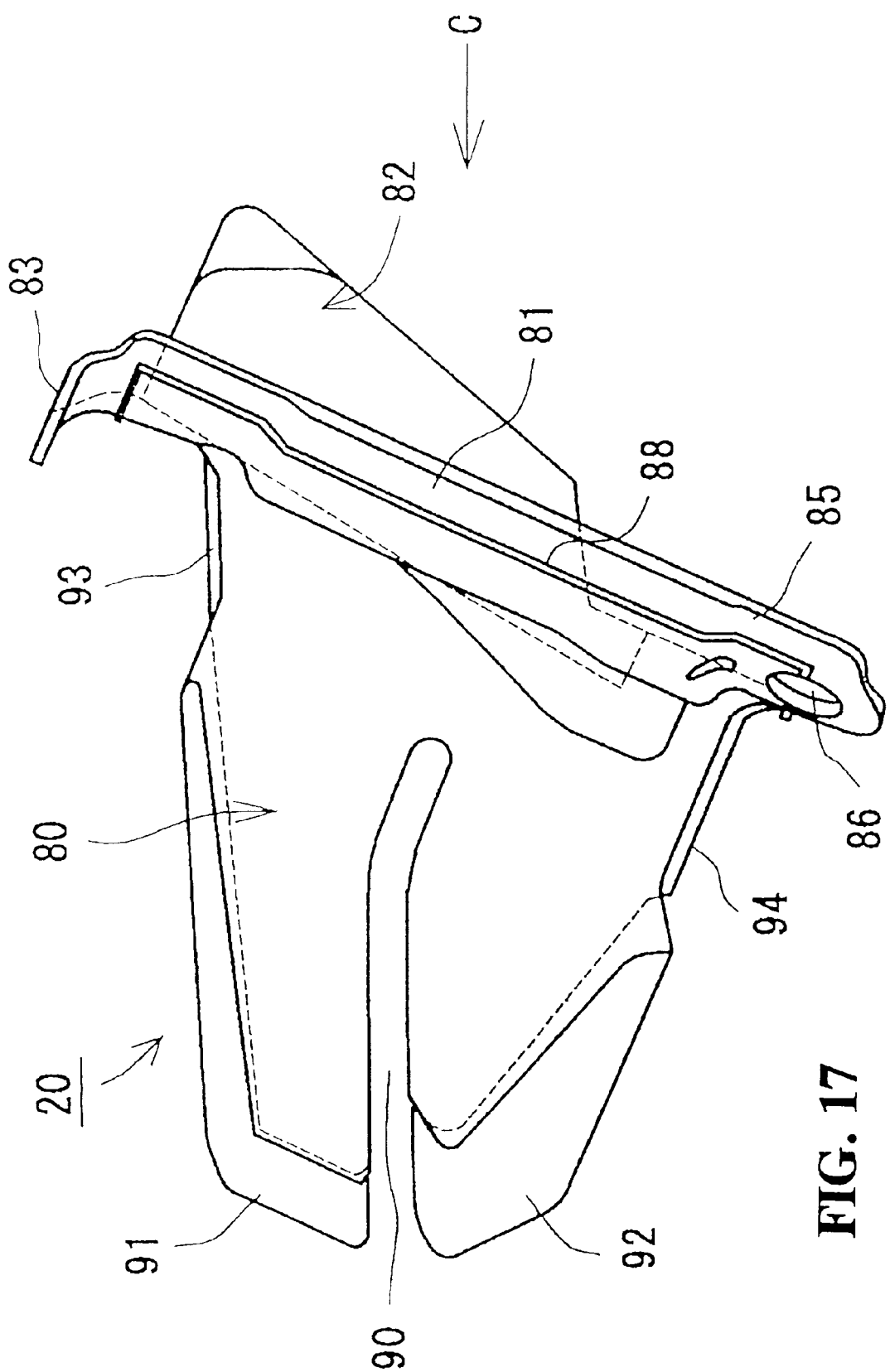
FIG. 17 is side view of a partitioning member.
Figure 18:
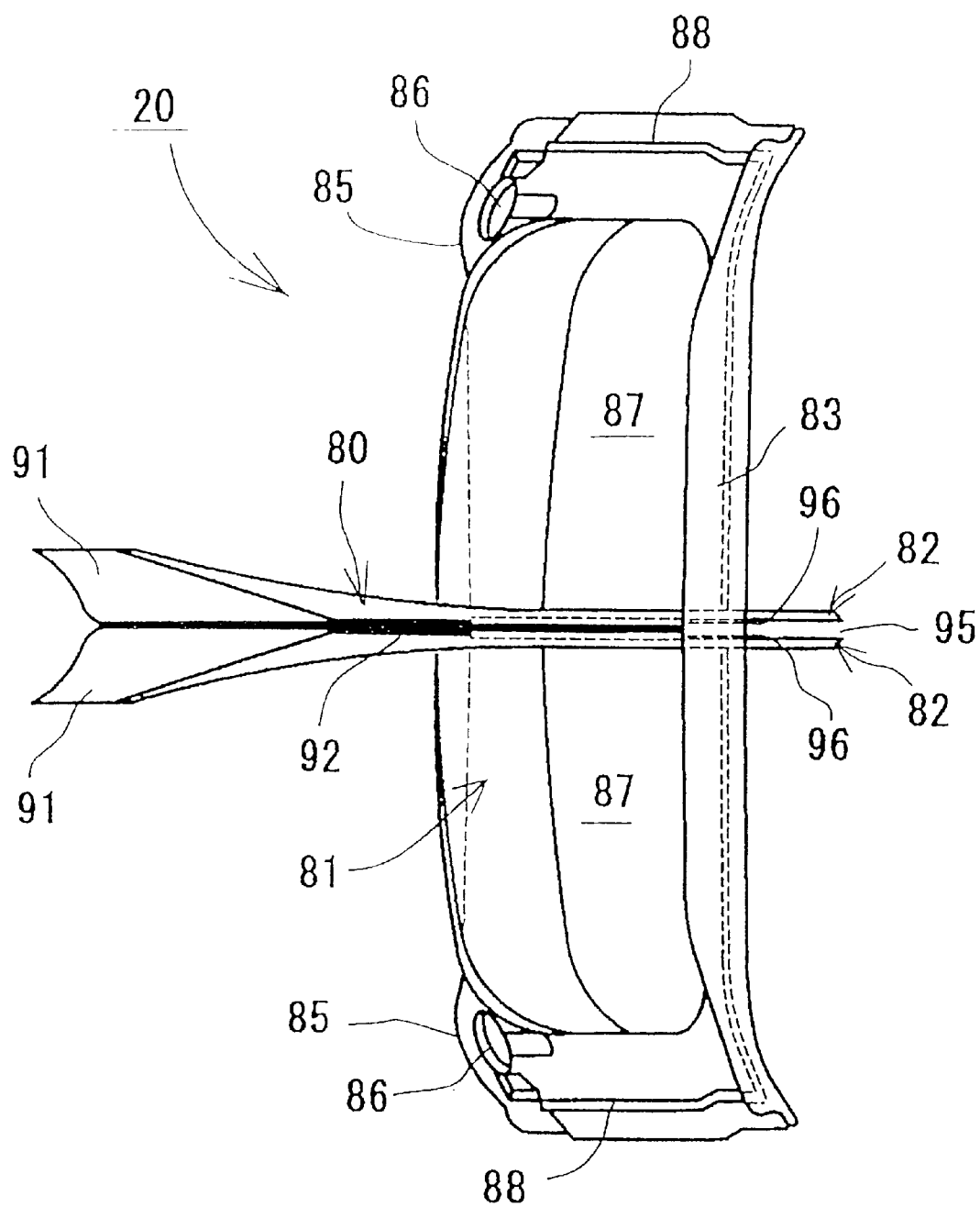
FIG. 18 is a plan view of the partitioning member shown in FIG. 17.
Figure 19:
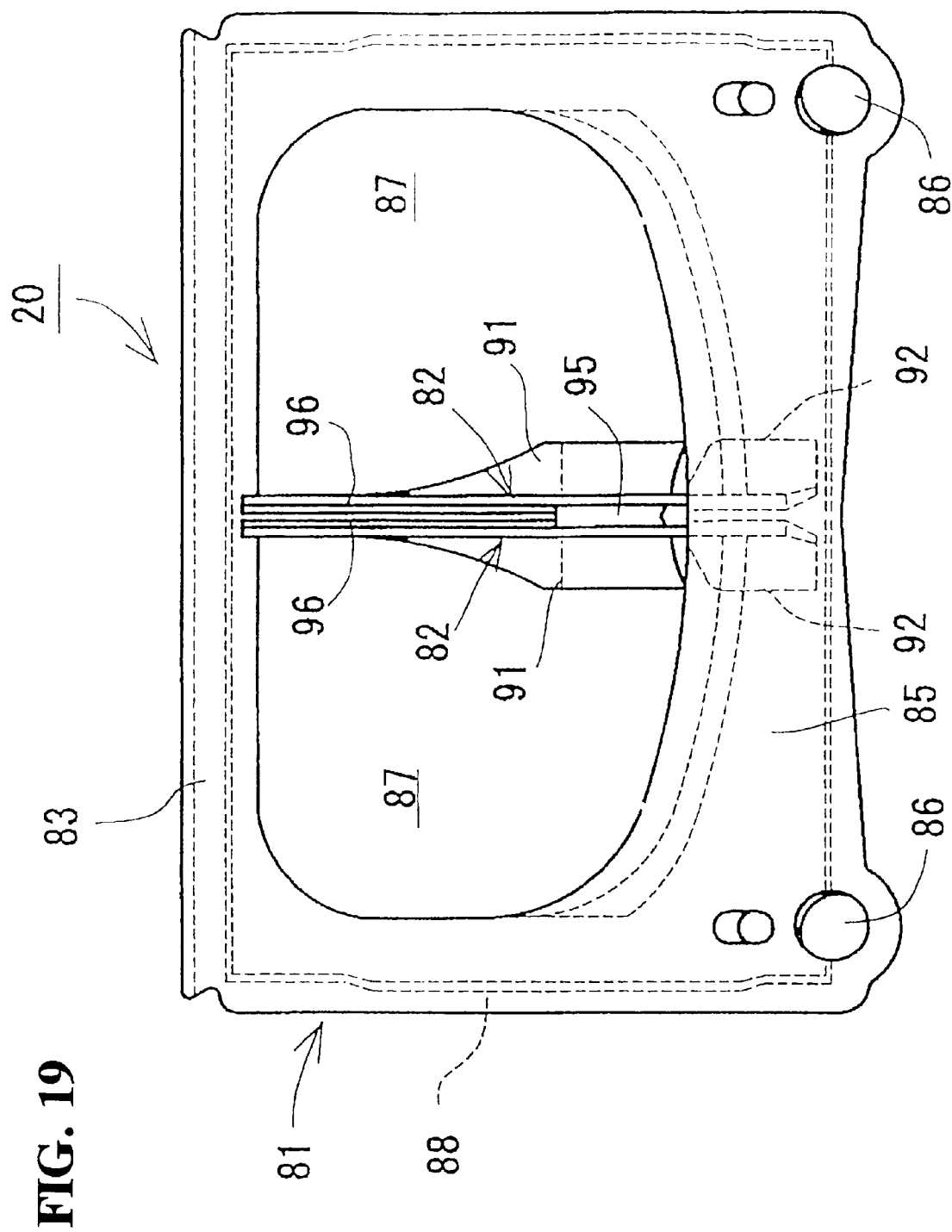
FIG. 19 is a view seen along the direction C of FIG. 17.

As is apparent from FIGS. 17 to 19, the partitioning member 20, which is made from a rigid resin having a somewhat flexibility, integrally includes a forward extension portion 80 extending forwardly for partitioning the space 13a into two parts (see FIG. 4), a lateral extension portion 81 extending in the lateral direction for covering the rear portion of the head box 1, and the above-described rearward extension portion 82.

The lateral extension portion 81 is mounted such that the upper portion thereof is brought into close-contact with the back surface of the ceiling portion 12c and a forwardly curved flange 83 formed at the upper end of the upper portion is overlapped to the upper surface of the ceiling portion 12c and fixed thereto by means of a bracket 84. A lower wall 85 of the lateral extension portion 81 is brought into close-contact with the back surface of the bottom portion 12e and is fastened thereto by means of a bolt (not shown) passing through mounting portions 86 formed in right and left end portions of the lower wall 85.

As is apparent from FIGS. 18 and 19, the lateral extension portion 81 has an opening portion 87 at a position over the lower wall 85. The opening portion 87 is divided into right and left parts by a connection portion between the forward extension portion 80 and the rearward extension portion 82. The right and left divided parts of the opening portion 87 are connected to the right and left parts of the space 13a partitioned by the forward extension portion 80, and further connected to the right and left intake passages B and A in the air cleaner 21, respectively. A sealing projection 88 is integrally formed on the front surface of the lateral extension portion 81 surrounding the opening portion 87.

The forward extension portion 80 has at its central portion a slit 90 being substantially similar to the rib 16a. The slit 90 is opened forwardly, and the rib 16a can be fittingly inserted in the slit 90 from the opened portion. The forward extension portion 80 includes flanges 91 on the vertical side and flanges 92 on the front end side. The flanges 91 are opened outwardly in the lateral direction, and the flanges 92 are also opened outwardly in the lateral direction. A portion of the lower surface 12d of the ceiling portion 12c, a portion of the upper surface 12f of the bottom portion 12e, and the back surface of the hollow columnar portion 16 are closely fitted between the right and left flanges 91 and between the right and left flanges 92. Accordingly, the forward extension portion 80 is certainly supported by making use of the rib 16a, ceiling portion 12c, bottom portion 12e, and hollow columnar portion 16. In addition, sealing projections 93 and 94 are integrally formed on the upper and lower portions, near the lateral extension portion 81, of the forward extension portion 80, respectively.

The rearward extension portion 82 is forked in the lateral direction, and the front cover bulkhead 29c can be closely fitted in a gap 95 between the forked parts of the rearward extension portion 82. The rear end of the rearward extension portion 82 is also forked into parts 96. The lateral separation rib 60a formed at the central portion of the front surfaces of the water drip walls 25 can be fitted in a gap between the forked parts 96. As a result, the rearward extension portion 82 can be connected to the water drip walls 25 while being supported by the front cover bulkhead 29c, to thereby certainly separate the intake passages A and B from each other.

The function of this embodiment will be described below. As is apparent from the figures, a plurality of the ribs 62 are formed on the side walls 61 of the water drip walls 25, and accordingly, when outside air is sucked from the head box 1 side into the intake passages A and B, even if the outside air contains moisture due to rain or the like, such moisture can be separated from the outside air by contact with the water drip walls 25 bent in the top view.

Since the ribs 62 formed on the side walls 61 of the water drip walls 25 project in the intake passages A and B and act as baffle plates, the contact areas of the water drip walls 25 with outside air are increased by the presence of the ribs 62, and also the flow of outside air is stepwise bent at the ribs 62 and comes into contact with the ribs 62 repeatedly. As a result, it is possible to further promote the moisture-air separation effect, and to effectively separate mud, having entered the intake passages A and B together with water, from the water.

The moisture and mud thus separated from the outside air are dropped along the water drip walls 25 and ribs 62 to the stepped portion 64. Since the stepped portion 64 is tilted in the forward direction and in the lateral direction, the moisture and mud flow to the bottom wall 63 around the stepped portion, and then readily discharged from the front end of the bottom wall 63 to the outside of the air cleaner 21 through the drain holes 29b.

Accordingly, it is possible to further improve the moisture-outside air separation efficiency, and to effectively prevent moisture introduced in the air cleaner together with outside air from being permeated into the clean room C in combination of the presence of the water drip walls 25. Further, since the water drip walls 25 include the ceiling portion 60 and the side walls 61 which are formed into a box-like shape capable of covering the opening of the intake pipe 27, it is possible to certainly separate the intake pipe 27 from water and mud having entered the intake passages A and B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner for a motorcycle having a longitudinal center line in which the air cleaner is disposed between a fuel tank supported over a body frame and an engine supported under the body frame, comprising:

a common case main body for holding the air cleaner, said common case main body being positioned beneath the fuel tank and on the longitudinal center line of the motorcycle; and a plurality of independent air cleaner elements disposed sideways in the common case main body for said air cleaner.

2. The air cleaner for a motorcycle according to claim 1, wherein a dirty room is provided in said case of said air cleaner, said dirty room being partitioned into a plurality of independent intake passages, each intake passage being connected to a corresponding one of said air cleaner elements; and part of each of a wall surface for partitioning said dirty room into said plurality of intake passages is taken as a water drip wall projecting in said intake passage.

3. The air cleaner for a motorcycle according to claim 2, wherein ribs are formed on said water drip wall, said ribs project into said intake passage.

4. The air cleaner for a motorcycle according to claim 1, and further including an intake duct disposed on an upstream side of said case and being in communication with said plurality of independent air cleaner elements for supplying air thereto.

5. The air cleaner for a motorcycle according to claim 4, and further including a partition for dividing the case into a dirty air portion and a clean air portion, said partition separating a flow of air from the air intake duct to direct the air to each of the independent air cleaner elements.

6. The air cleaner for a motorcycle according to claim 5, wherein said partition is a water drip wall for separating moisture from the air supplied from the air intake duct and further including a discharge drain formed in said case for discharging moisture therefrom.

7. The air cleaner for a motorcycle according to claim 6, wherein said case is disposed at an angle for assisting in the discharge of moisture through the discharge drain.

8. An air cleaner for a motorcycle having a longitudinal center line, comprising:

a fuel tank having a recessed portion provided in a lower surface thereof, a common case main body for holding the air cleaner, said common case main body being positioned within said recess formed in the lower surface of said fuel tank and on the longitudinal center line of the motorcycle; and a plurality of independent air cleaner elements disposed sideways in the common case main body for said air cleaner.

9. The air cleaner for a motorcycle according to claim 8, wherein a dirty room is provided in said case of said air cleaner, said dirty room being partitioned into a plurality of independent intake passages, each intake passage being connected to a corresponding one of said air cleaner elements; and part of each of a wall surface for partitioning said dirty room into said plurality of intake passages is taken as a water drip wall projecting in said intake passage.

10. The air cleaner for a motorcycle according to claim 9, wherein ribs are formed on said water drip wall, said ribs project into said intake passage.

11. The air cleaner for a motorcycle according to claim 8, and further including an intake duct disposed on an upstream side of said case and being in communication with said plurality of independent air cleaner elements for supplying air thereto.

12. The air cleaner for a motorcycle according to claim 11, and further including a partition for dividing the case into a dirty air portion and a clean air portion, said partition separating a flow of air from the air intake duct to direct the air to each of the independent air cleaner elements.

13. The air cleaner for a motorcycle according to claim 12, wherein said partition is a water drip wall for separating moisture from the air supplied from the air intake duct and further including a discharge drain formed in said case for discharging moisture therefrom.

14. The air cleaner for a motorcycle according to claim 13, wherein said case is disposed at an angle for assisting in the discharge of moisture through the discharge drain.

15. An air cleaner for a motorcycle in which an air cleaner is disposed between a fuel tank supported over a body frame and an engine supported under the body frame, comprising:

a case for holding an air cleaner, said case being positioned beneath the fuel tank; and a plurality of independent air cleaner elements disposed sideways in the case for said air cleaner, wherein a dirty room is provided in said case of said air cleaner, said dirty room being partitioned into a plurality of independent intake passages, each intake passage being connected to a corresponding one of said air cleaner elements, and part of each of a wall surface for partitioning said dirty room into said plurality of intake passages is taken as a water drip wall projecting in said intake passage.

16. The air cleaner for a motorcycle according to claim 15, wherein ribs are formed on said water drip wall, said ribs project into said intake passage.

17. The air cleaner for a motorcycle according to claim 15, and further including an intake duct disposed on an upstream side of said case and being in communication with said plurality of independent air cleaner elements for supplying air thereto.

18. The air cleaner for a motorcycle according to claim 17, and further including a partition for dividing the case into a dirty air portion and a clean air portion, said partition separating a flow of air from the air intake duct to direct the air to each of the independent air cleaner elements.

19. The air cleaner for a motorcycle according to claim 18, wherein said partition is a water drip wall for separating moisture from the air supplied from the air intake duct and further including a discharge drain formed in said case for discharging moisture therefrom.

20. The air cleaner for a motorcycle according to claim 19, wherein said case is disposed at an angle for assisting in the discharge of moisture through the discharge drain.

* * * * *